(12) United States Patent
Ackermann (10) Patent No.: US 7,487,863 B2
(45) Date of Patent: Feb. 10, 2009

(54) PRESSURE CONTAINER IN A VIBRATION DAMPER

(75) Inventor: Norbert Ackermann, Eitorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 11/352,486

(22) Filed: Feb. 9, 2006

(65) Prior Publication Data

US 2006/0175168 A1  Aug. 10, 2006

(30) Foreign Application Priority Data

Feb. 9, 2005   (DE) .................. 10 2005 005 789

(51) Int. Cl.
  *F16F 9/52*  (2006.01)
(52) U.S. Cl. .............. 188/277; 188/315; 188/282.8; 188/322.13; 188/322.21; 267/64.28; 137/539; 137/74
(58) Field of Classification Search ............. 188/276, 188/277, 315, 282.7, 282.8, 322.13, 322.16, 188/322.19, 322.21; 267/64.28; 137/539, 137/72, 74, 79
See application file for complete search history.

(56) References Cited

U.S. PATENT DOCUMENTS

| | | | | |
|---|---|---|---|---|
| 2,256,835 A * | 9/1941 | Mercier | ............ | 267/64.23 |
| 3,033,556 A * | 5/1962 | Wossner | ............ | 267/64.19 |
| 3,674,290 A * | 7/1972 | McNally | ............ | 285/248 |
| 3,837,444 A | 9/1974 | Allinquant et al. | | |
| 3,945,663 A * | 3/1976 | Duckett | ............ | 280/6.159 |
| 3,951,392 A * | 4/1976 | de la Faille | ............ | 267/64.16 |
| 4,257,580 A * | 3/1981 | Schnitzius | ............ | 267/64.28 |
| 4,700,815 A * | 10/1987 | Persicke et al. | ............ | 188/286 |
| 5,106,065 A * | 4/1992 | Staton et al. | ............ | 267/64.11 |
| 5,226,682 A * | 7/1993 | Marrison et al. | ............ | 285/308 |
| 5,314,045 A * | 5/1994 | Fenn et al. | ............ | 188/322.21 |
| 5,499,655 A * | 3/1996 | Hung | ............ | 137/512.3 |
| 5,927,761 A * | 7/1999 | Bartholomew | ............ | 285/114 |
| 6,116,585 A * | 9/2000 | Lutz | ............ | 267/64.27 |
| 6,179,099 B1 * | 1/2001 | Koch et al. | ............ | 188/277 |
| 6,450,307 B2 | 9/2002 | Lutz | | |
| 6,467,760 B2 * | 10/2002 | Lutz | ............ | 267/64.28 |
| 6,648,309 B2 * | 11/2003 | Beck | ............ | 267/64.17 |

(Continued)

FOREIGN PATENT DOCUMENTS

| | | |
|---|---|---|
| DE | 1 124 310 | 2/1962 |
| DE | 89 06 615 | 7/1989 |
| JP | 57184769 A * | 11/1982 |

OTHER PUBLICATIONS

Office Action dated Aug. 10, 2005 issued for corresponding German Application No. 10 2005 005 789.6-12.

*Primary Examiner*—Xuan Lan Nguyen
(74) *Attorney, Agent, or Firm*—Cohen Pontani Lieberman & Pavane LLP (57) ABSTRACT

Vibration damper with a damping medium-filled cylinder, in which a piston rod is installed with freedom of axial movement, and a pressure container, which is connected to the vibration damper by an adapter piece. The adapter piece comprises a connecting part, which is connected to the pressure container, and an upper part, which is connected permanently to the vibration damper. A filling channel inside the adapter piece is open at both ends when the pressure container is full, and a filling channel on the vibration damper side, which is connected to the filling channel of the adapter piece, has a closing element.

16 Claims, 7 Drawing Sheets

U.S. PATENT DOCUMENTS

| | | | |
|---|---|---|---|
| 7,036,802 B2 * | 5/2006 | Beck | 267/64.17 |
| 7,097,015 B2 * | 8/2006 | Beck | 188/315 |
| 2006/0096820 A1 * | 5/2006 | Beck | 188/322.16 |
| 2006/0185947 A1 * | 8/2006 | Mintgen | 188/277 |

* cited by examiner

PRESSURE CONTAINER IN A VIBRATION DAMPER

BACKGROUND OF THE INVENTION

1. Field of the Invention

The invention relates to a vibration damper having a cylinder filled with damping medium, a container surrounding the cylinder and forming a compensating space between the container and the cylinder, an endwall fixed to an end of the container and enclosing an end of the cylinder and an end of the compensating space, a piston rod received through the endwall, and a pressure container in the compensating space.

2. Description of the Related Art

U.S. Pat. No. 6,467,760 describes a vibration damper with a pressure container inside the compensating space. The pressure container consists of a sleeve welded at the ends, which can be filled with gas through a filling channel, which passes through an adapter piece. For this purpose, one end of the upper part of the adapter is installed completely within the piston rod guide. The adapter piece has a shoulder, which is introduced into a radial groove inside the piston rod and which functions as a lock, which prevents the adapter piece from being pulled out. This method of installing the adapter piece means that the sleeve cannot expand uniformly in the radial direction. Only the radially inner wall can expand, whereas the radially outer wall rests against the cylinder. Thus the adapter piece is subjected to bending stress, which shortens its life-span. In addition, the pretension on the ring seal between the adapter piece and the piston rod guide can also be subject to variation.

SUMMARY OF THE INVENTION

An object of the present invention is to improve the connection between the pressure container and the vibration damper in such a way that the problems known from the state of the art are corrected.

According to the invention, a filling channel inside the adapter piece is open when the pressure container is full, and a filling channel on the vibration damper side, which is connected to the filling channel of the adapter piece, has a closing element.

The great advantage here is that the operating pressure is present at both axial ends of the adapter piece. Depending on the size of the ends subjected to the operating pressure, the forces acting on the adapter piece can be considerably reduced, so that it would be possible to use cheaper grades of material. In addition, the pressure container can also be designed so that there is a certain gap between it and the edges of a piston rod guide, so that no bending loads are imposed on the adapter piece.

For this purpose, the adapter piece has a cylindrical lateral surface by which it is sealed to the vibration damper. This prevents damping medium from mixing with a gas cushion in the pressure container, which would impair the functionality of the vibration damper over the long term. In addition, the adapter piece needs to be pretensioned only radially in the area of the seal; no axial pretension is required.

In another advantageous embodiment, the adapter piece has an axial positioning stop, which provides support on the vibration damper side. The positioning stop is a very simple means of ensuring a defined installation position.

The defined installation position is important when, for example, the upper part of the adapter piece has at least one shoulder for a fastening means at the end facing the vibration damper. Because the pressures at the two ends are equal, the fastening means, e.g., a fastening clamp, is required to absorb only very light loads.

According to a preferred embodiment, at least one receptacle is provided on the vibration damper side, by means of which the fastening means is secured in the axial direction of the adapter piece. The receptacle can be formed, for example, by two parallel bores, into which a fastening clamp fits.

In addition, the upper part of the adapter piece can have at least one tool-engagement surface for the orientation of the adapter piece in the circumferential direction with respect to the sleeve of the pressure container. When, for example, a fastening clamp is used to secure the adapter piece, the adapter piece can have a holding area formed by flats. These flats should advisably be oriented toward the fastening clamp.

In another embodiment, the adapter piece consists of several parts, where a separate retaining part, which can be connected to the vibration damper, can be connected to the connecting part. The really essential point is that the filling channel on the vibration damper side has a simple geometry and can thus be manufactured by a simple boring operation, for example.

Thus the retaining part is designed as a tubular body, which is pressed into the connecting part. The tubular body is pressed into the vibration damper first, and the connecting part is then pressed in turn onto the tubular body, which means that very simple components can be used.

In another variant, the upper part of the adapter piece is fastened to the vibration damper by a latching type of connection. The advantage of this is that no additional fastening means are required.

To ensure the simplest possible geometry of the filling channel on the vibration damper side, the vibration damper has a graduated opening, in which a retaining tube is installed, against which the latching means of the upper adapter part is supported.

In another variant, the filling channel has a shoulder, against which the closing element rests to form a seal. The pressure prevailing in the pressure container pretensions the closing element onto the shoulder.

Especially so that a simple filling apparatus can be provided, the closing element is pressed by a pretensioning spring onto the shoulder. By the use of a simple, needle-like tool, the closing element can be moved independently of the pressure inside the pressure container from the closed position on the shoulder to the open position, which releases the filling channel.

To ensure a compact design, the pretensioning spring is supported against an end surface of the adapter piece.

If desired, the closing element can be formed by a thermal element, which opens the filling channel above a certain limit temperature. In the event of a fire, the pressure in the vibration damper can be released very quickly via the thermal element.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
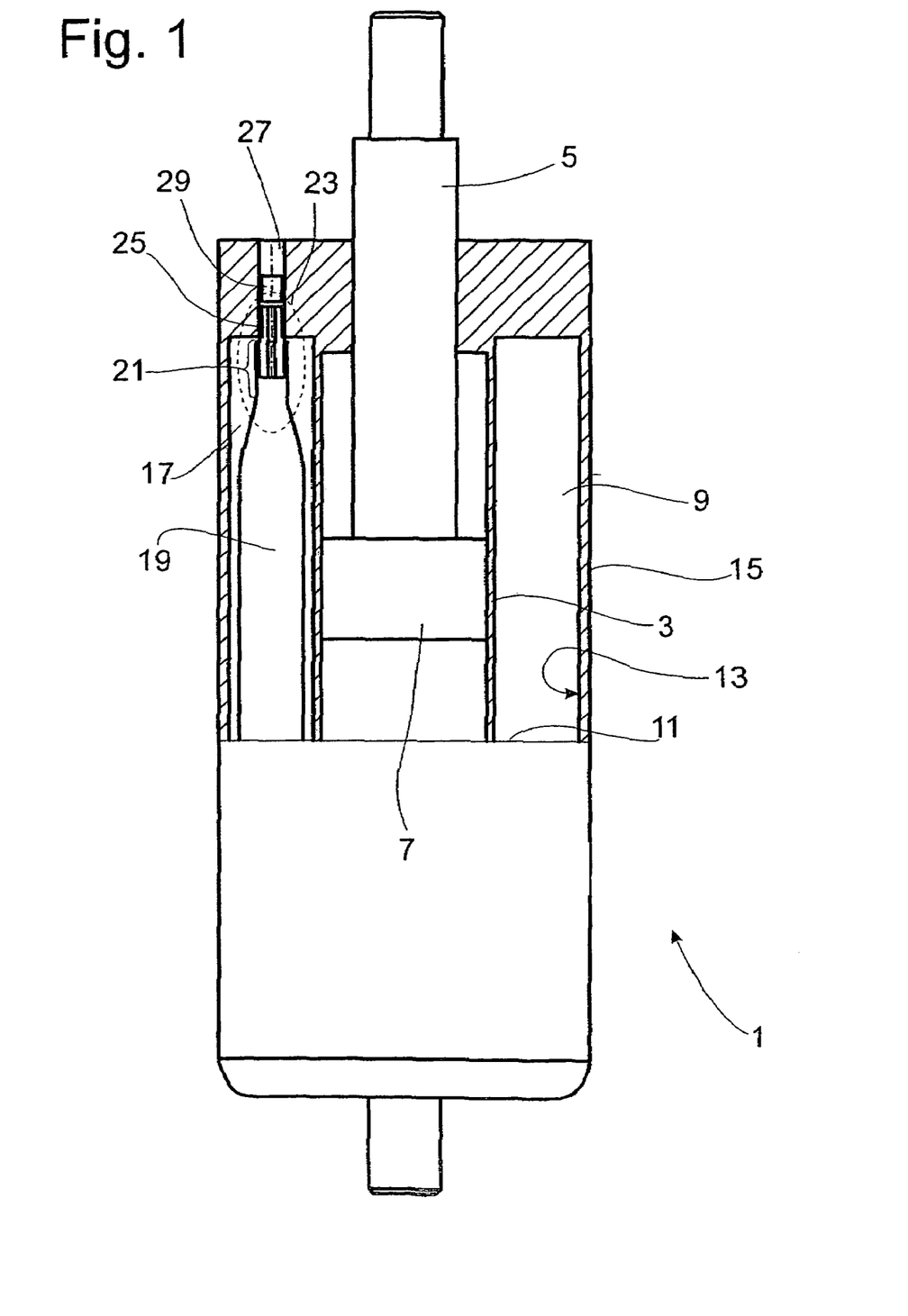
FIG. 1 is a partial cross-section of the installation situation.

FIG. 1 shows a simplified diagram of a vibration damper 1 of the two-tube type. The actual design of the damper is not important with respect to the use of the invention.

The vibration damper 1 has a damping medium-filled cylinder 3, in which a piston rod 5 is free to move axially together with a piston 7. The volume displaced by the inward and outward-traveling piston rod 5 is displaced into a compensating space 9, which is located between the outside wall 11 of the cylinder 3 and an inside wall 13 of a container 15 surrounding the cylinder 3. Inside the compensating space 9, a pressure container 17 is provided, which has a sleeve body 19, into the end 21 of which an adapter piece 23 is fastened, the upper part 25 of which is connected in turn to a filling channel 27 on the vibration damper side. A closing element 29, separate from the adapter piece 23, seals off the filling channel 27. The adapter piece 23 itself has no closing element.

Figure 2:
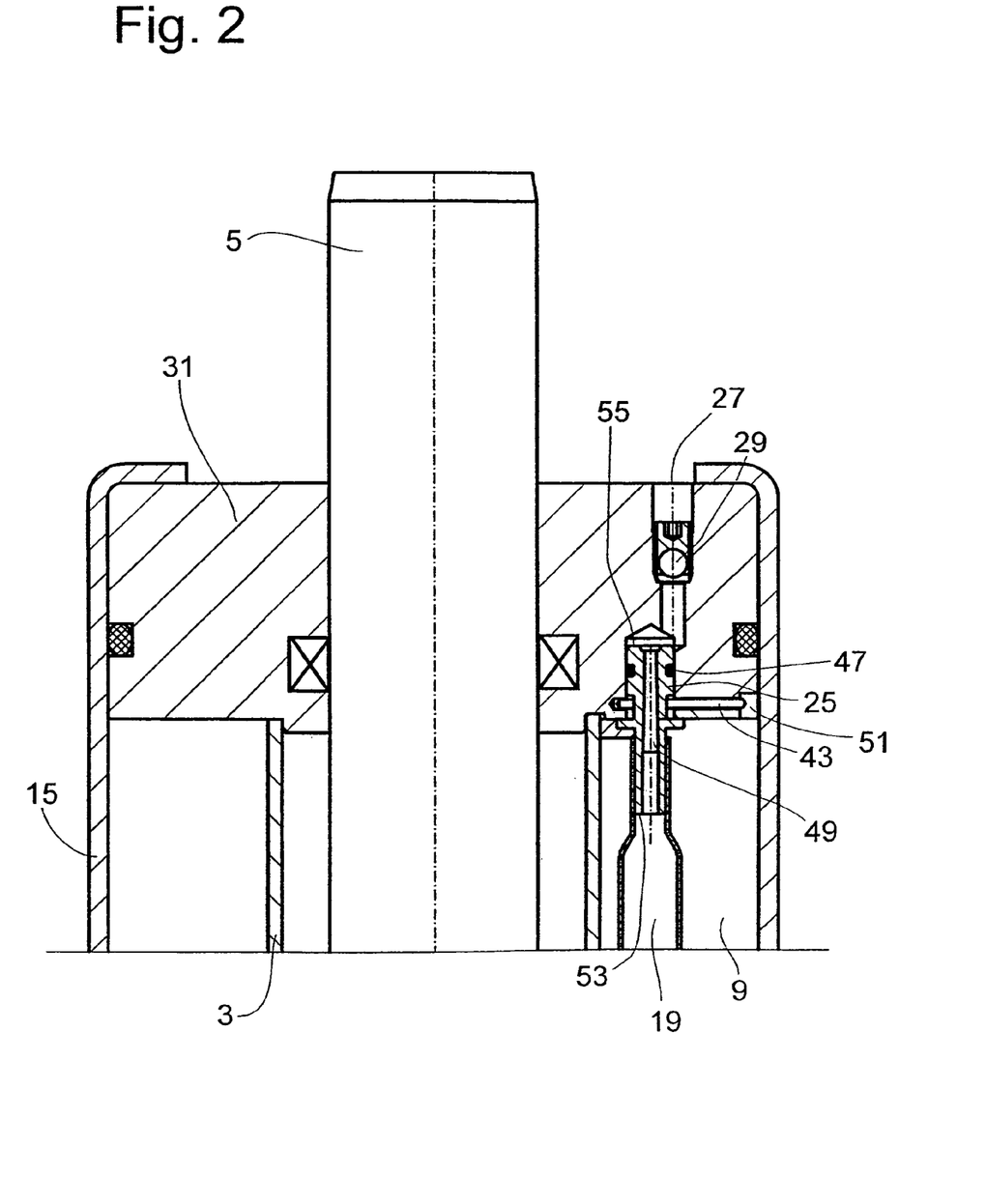
FIG. 2 is a cross-section of a first embodiment inventive adapter piece.

FIG. 2 shows the upper area of the vibration damper 1 in detail. The vibration damper 1 is closed off at one end by an endwall in the form of a piston rod guide 31, which has the filling channel 27. The channel can be radially offset, if desired, in such a way that that simple production tools can be used and also so that a favorable position for the sleeve body 19 inside the compensating space 9 is created. It can be seen in this figure that the gas-filled sleeve body 19 has no contact with the cylinder 3 or with the container 15, which means that no bending forces can act on the adapter piece 23.

Figure 3:
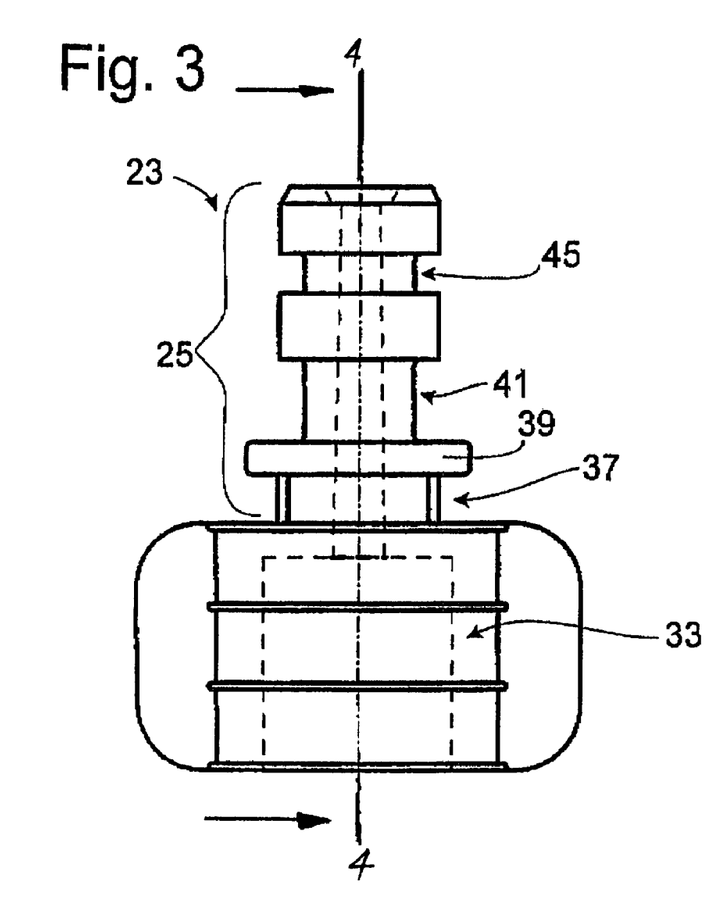
FIG. 3 is a side view of the adapter piece of FIG. 2 as a separate part.
Figure 3A:
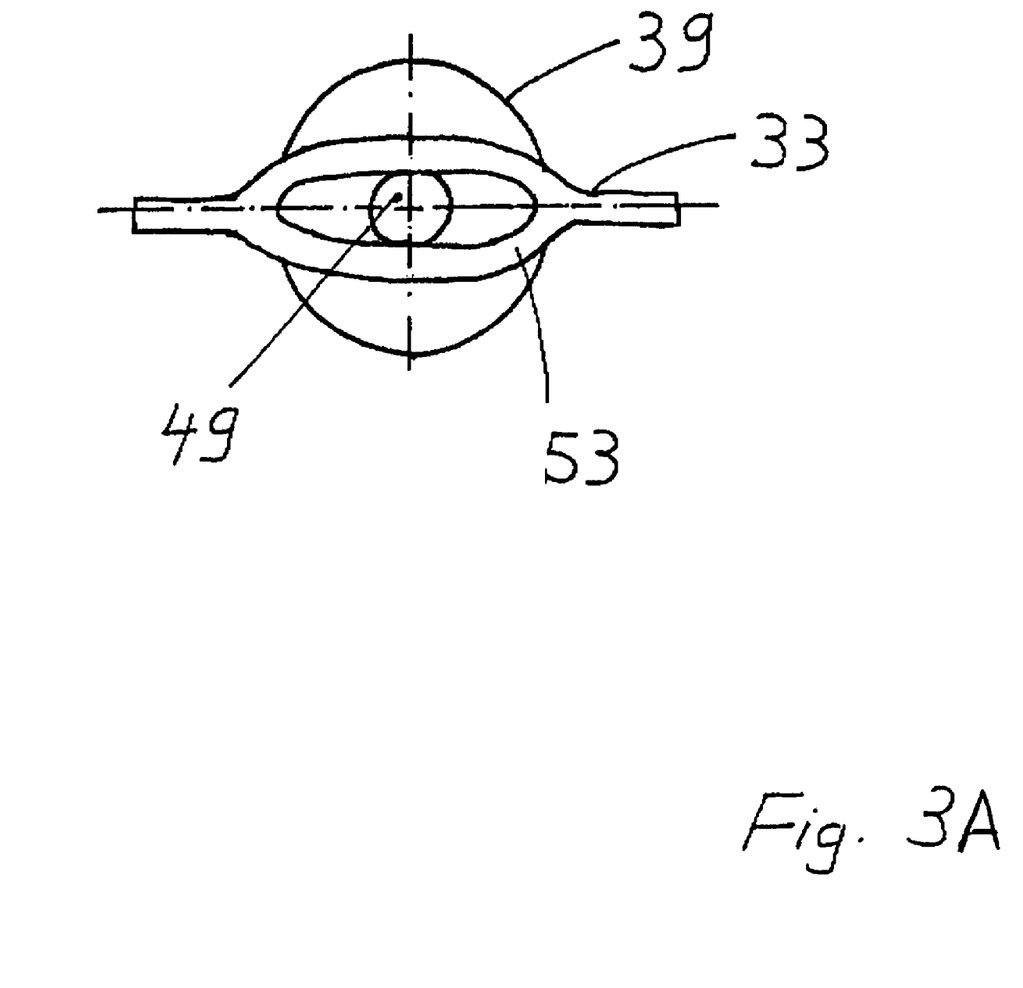
FIG. 3A is an end view of the adapter piece of FIG. 3.
Figure 4:
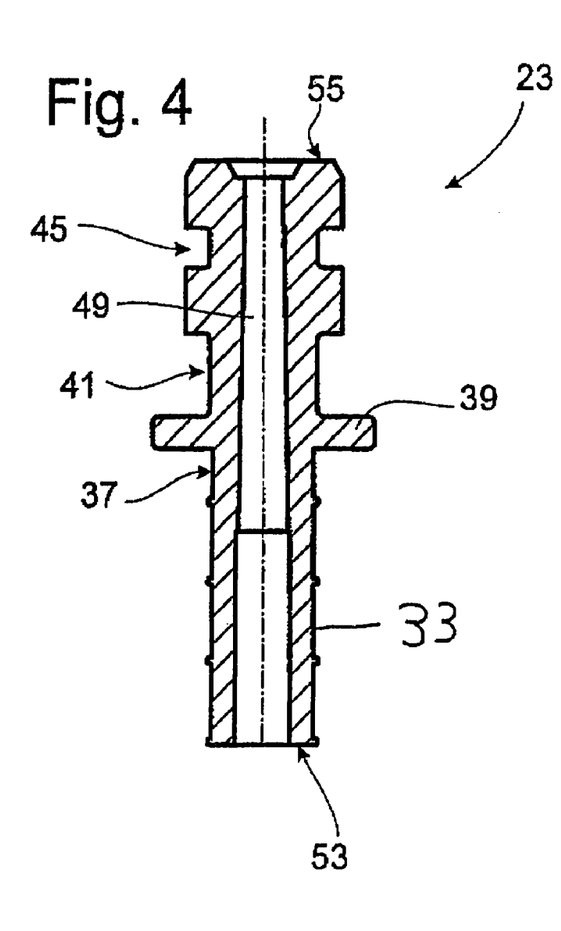
FIG. 4 is a cross-section taken along the line 4-4 of FIG. 3.

As can be seen in FIGS. 3 and 4, the adapter piece 23 has a connecting part 33, which is welded into the end 21 of the pressure container 17. The upper part 25 of the adapter piece has several functional sections arranged axially in a row. Directly above the connecting part in the axial direction, a tool-engagement surface 37 is provided, which is formed by two parallel flats. This is followed by a positioning stop 39 on the vibration damper side, which in this case rests against the bottom surface of the piston rod guide 31. By looking at FIGS. 2-4 in combination, we can see that, above the positioning stop 39, a shoulder 41 for a fastener, e.g., a fastening clamp 43, is present. Above the shoulder 41, a ring-shaped groove 45 for a sealing ring 47 is formed. This sealing ring seals off the cylindrical lateral surface of the adapter piece against the vibration damper and prevents leakage between the filling channel 27 on the vibration damper side and the adapter piece 23. As is especially clear in FIG. 4, a filling channel 49, which is open at the ends, extends all the way through the adapter piece 23 and is connected to the filling channel 27 on the vibration damper side. The closing element 29, e.g., a ball, closes the filling channel 27 on the vibration damper side. The filling channel 49 inside the adapter piece 23 remains open under all operating conditions.

During assembly, the still-pressureless pressure container 17 is connected by the adapter piece 23 to the piston rod guide 31, in that the upper part 25 of the adapter piece is introduced into the filling channel 27 on the vibration damper side. To secure the connection in the axial direction, the fastening clamp 43 is used, which is pushed radially into a receptacle 51 inside the piston rod guide. The seal 47 is radially pretensioned by the piston rod guide 31 and therefore can fulfill its sealing function independently of its axial position inside the piston rod guide. Then the pressure container is filled with a gas in a suitable device (not shown). The closing element 29 is pressed into the filling channel 27 on the vibration damper side, where the filling channel 49 inside the adapter piece 23 remains open at both ends. The pressure inside the pressure container 17 therefore acts on both the lower and the upper end surfaces 53, 55 of the adapter piece 23, which is thus subjected to no thrusting forces at all or at most to very small ones, because the pressures at the two ends are equal.

Figure 5:
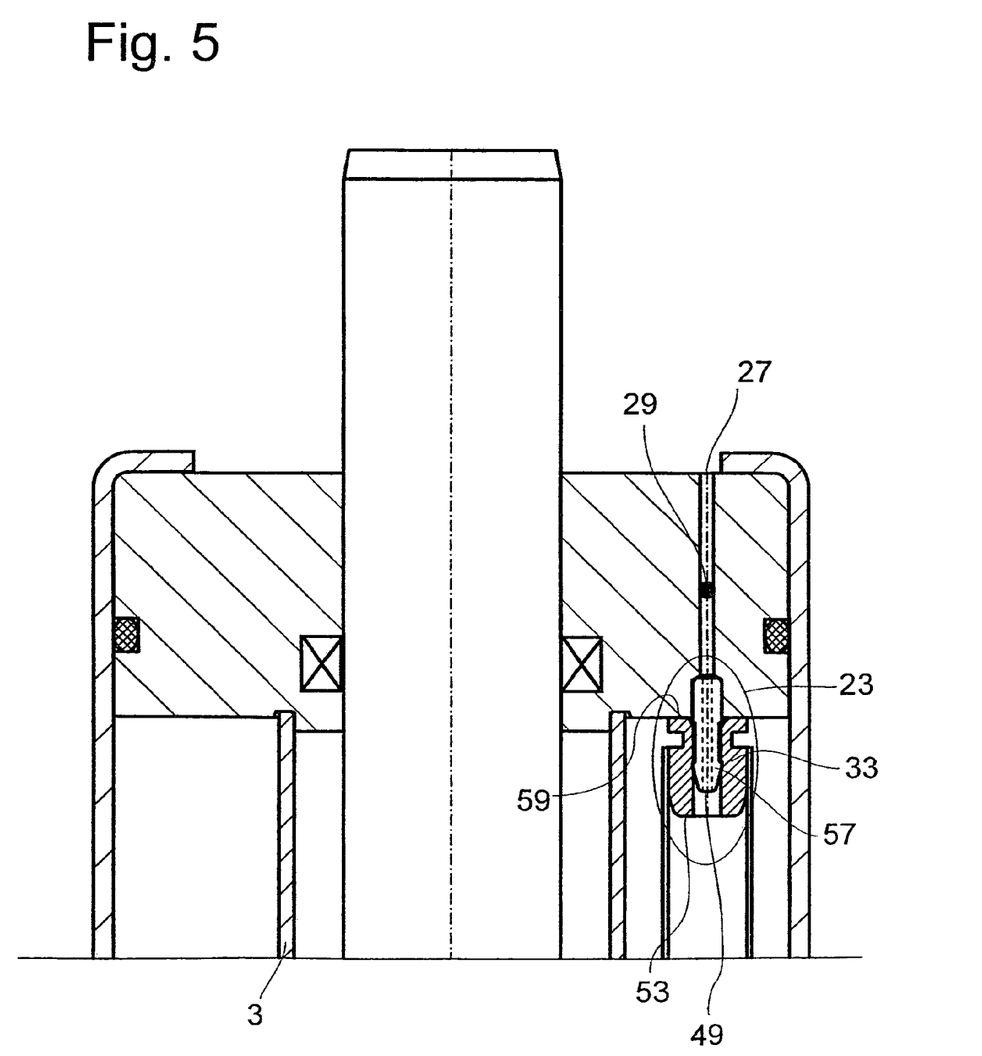
FIG. 5 shows a two-part adapter piece.

FIG. 5 shows a two-part adapter piece 23. A separate retaining part 57 and the connecting part 33 form the adapter piece 23 and can be connected to each other. During assembly, the retaining part 57 is pressed into the filling channel 27 on the vibration damper side. The press-fit is designed so that no leakage will occur. If desired, sealing means can also be introduced into the press-fit. The retaining part 57 is designed as a simple tubular body with a filling channel 49. The connecting part 33 has a through-opening by which it can be pressed onto the retaining part 57. Although an upper end surface 59 of the connecting part 33 rests against the bottom surface of the piston rod guide 31, this contact is not pressure-tight. As a result, the pressure at the upper end surface 59 of the connecting part is the same as that at the lower end surface 53. Nearly the same situation is present at the retaining part 57, which, if desired, rests against a shoulder in the filling channel 27 on the vibration damper side. In this variant, too, a closing element 29 separate from the adapter piece 23 is used for the filling channel 27 on the vibration damper side.

Figure 6:
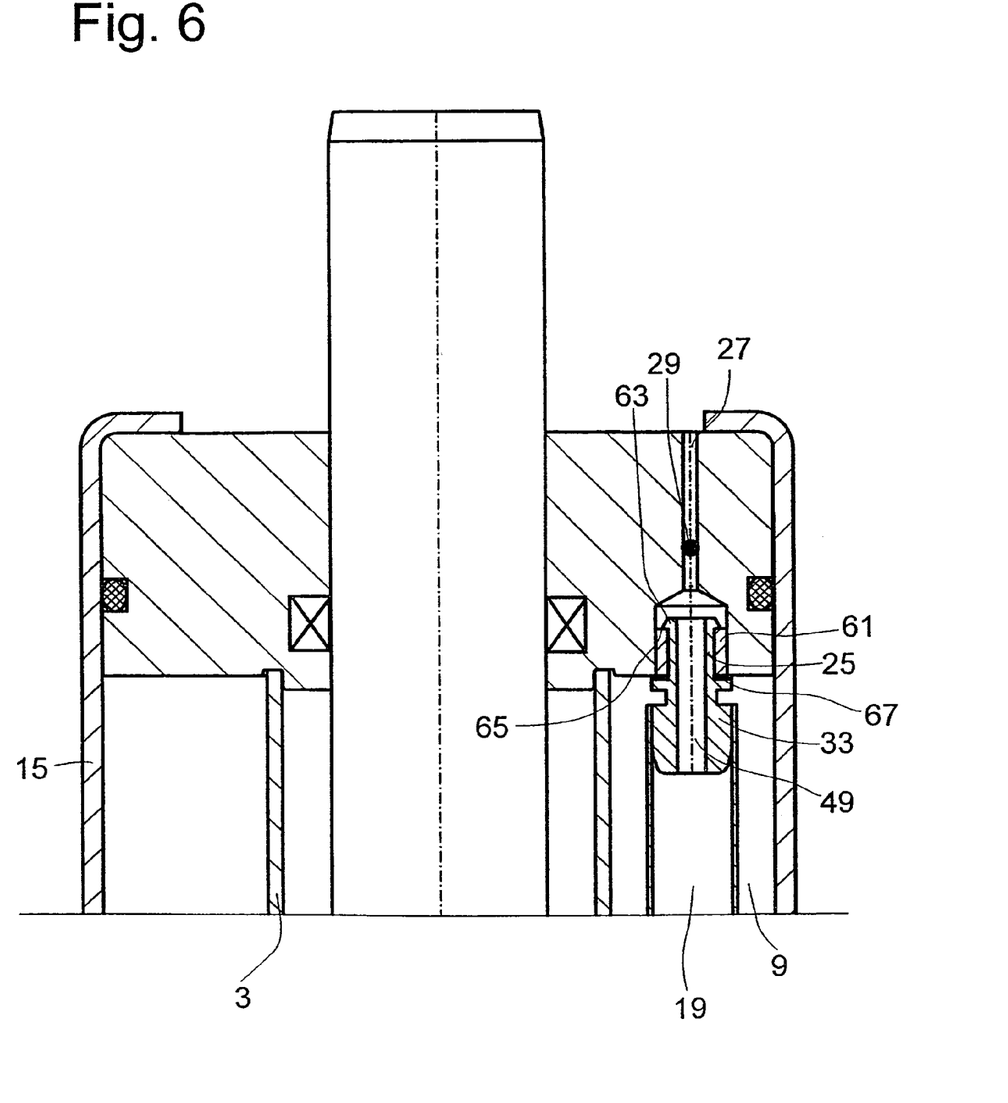
FIG. 6 shows a latching adapter piece.

FIG. 6 shows another solution, in which a filling channel 27 on the vibration damper side is again designed with a very simple geometry. Here, too, the adapter piece can be positioned radially in such a way that a contact between the sleeve body 19 and the cylinder 3 or with the container tube 15 is excluded.

The filling channel 27 on the vibration damper side has a graduated opening, where the larger diameter is closer to the compensating space 9. In the lower section of the filling channel, a retaining tube 61 is installed, preferably pressed in, to form a pressure-tight seal. The upper part 25 of the adapter piece has a latch 63, which is supported axially against the upper end surface 65 of the retaining element tube 61 when in the final installed position, as shown in FIG. 6. The upper part 25 of the adapter piece is pressed into the retaining tube 61. Instead of the press-fit, it is also possible to use here a seal 67 to prevent the damping medium and gas from mixing.

Figure 7:
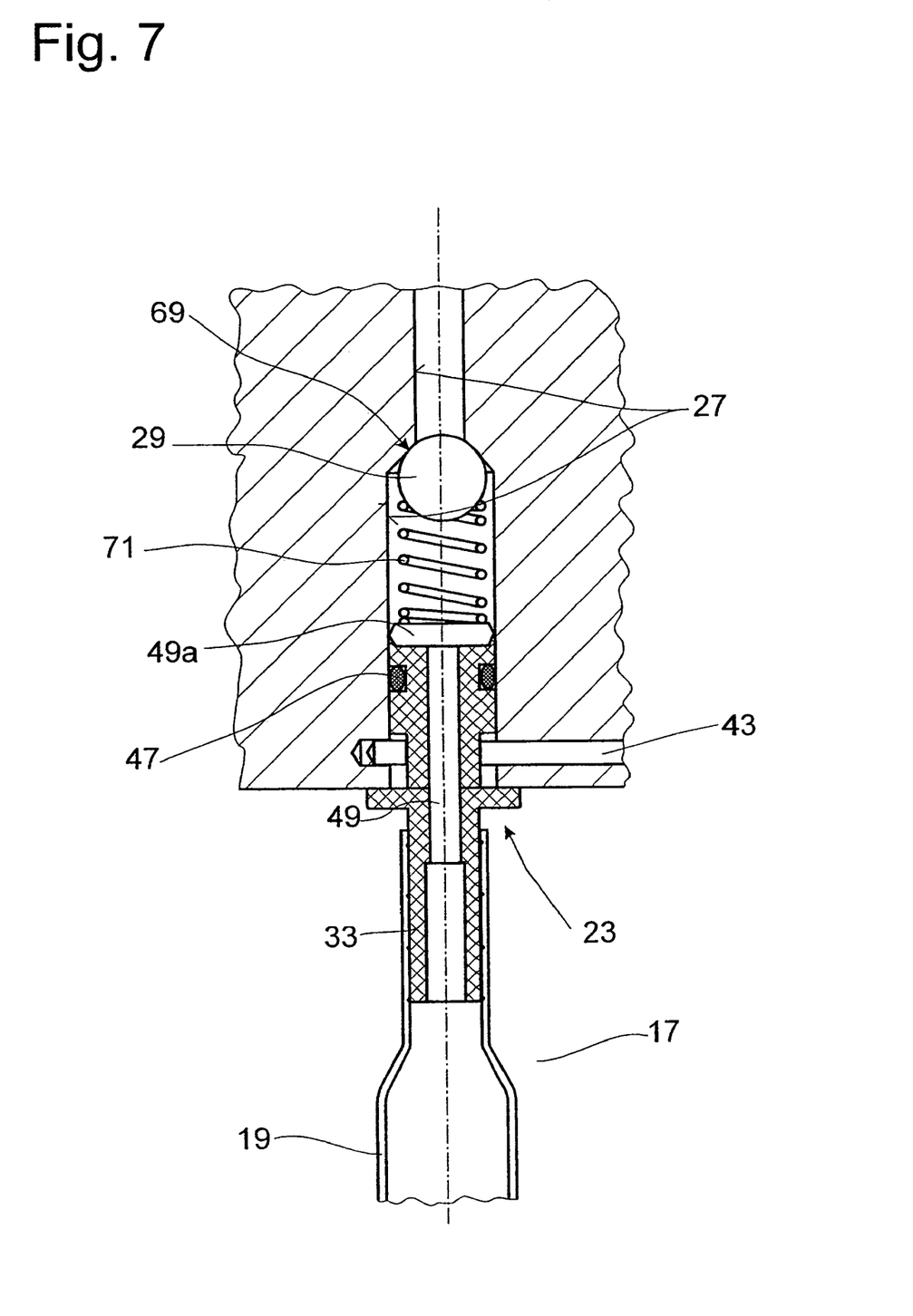
FIG. 7 shows a closing element pretensioned by a spring.

The variant according to FIG. 7 contains features of FIGS. 2 and 6. Thus, the filling channel 27 in the vibration damper and the filling channel 49 in the adapter piece 23 are on the same axis, where the filling channel 27 is formed by a graduated opening, the larger diameter of which faces the adapter piece 23. The closing element 29 rests axially on a shoulder 69 of the graduated opening and is pressed toward the shoulder by a pretensioning spring 71, one end of which is supported against the end surface 55 of the adapter piece. So that the pretensioning spring cannot close the filling channel 49 under any circumstances, the filling channel has a transverse channel 49a. The closing element can be designed as a thermal element, which melts above a limit temperature and thus releases the filling channel 27, so that the gas present in the sleeve body 19 can escape. With respect to the apparatus required, this variant can be very easily filled, because the pressure inside the pressure container 17 and the pretensioning spring 71 always move the closing element into the closed position.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A vibration damper comprising:
   a cylinder filled with damping medium;
   a container surrounding said cylinder and forming a compensating space between the container and the cylinder;
   an endwall fixed to an end of the container and enclosing an end of the cylinder and an end of the compensating space, said endwall having a first filling channel connected to said compensating space and a closing element in the first filling channel, said first filling channel having a shoulder facing said compensating space;
   a spring which loads the closing element against the shoulder;
   a piston rod received through said endwall, the piston rod being connected to a piston which is movable in the cylinder;
   a pressure container in said compensating space; and
   an adapter having first and second ends and a second filling channel extending from said first end to said second end, said adapter having an upper part proximate said first end fixed to said endwall and a connecting part proximate said second end connected to said pressure container such that said pressure container is connected to said end wall only by said adapter, said second filling channel of said adapter having a first open end which communicates with said first filling channel in said endwall, and a second open end inside said pressure container,
   wherein the upper part comprises flats for rotating the adaptor with respect to the endwall, whereby the pressure container can be oriented in the compensating space.

2. The vibration damper of claim 1 wherein the upper part of the adapter has a cylindrical surface which is sealed in the endwall.

3. The vibration damper of claim 1 wherein the adapter comprises a stop which is received against the endwall inside the compensating space.

4. The vibration damper of claim 1 wherein the upper part of the adapter comprises a shoulder facing the compensating space, the damper further comprising a fastener which is seated against said shoulder to position said adapter with respect to said endwall.

5. The vibration damper of claim 4 wherein the endwall comprises a receptacle which communicates with the upper part, the fastener being received in the receptacle.

6. The vibration damper of claim 1 wherein the upper part and the connecting part are formed as separate pieces, the upper part having a retaining part which is connected to the connecting part.

7. The vibration damper of claim 6 wherein the retaining part comprises a tubular body which is received in the connecting part.

8. The vibration damper of claim 1 wherein the upper part comprises a latch which retains the upper part to the endwall.

9. The vibration damper of claim 8 wherein the endwall comprises a graduated opening communicating with said first filling channel in said endwall, said damper further comprising a retaining tube fixed in said graduated opening, said latch engaging said retaining tube.

10. The vibration damper of claim 1 wherein the spring is supported on the adapter.

11. The vibration damper of claim 10 wherein the adapter has an end face with a transverse channel, the spring being supported against the end face.

12. The vibration damper of claim 1 wherein the closing element opens the first filling channel in the endwall when a predetermined temperature is exceeded.

13. The vibration damper of claim 1 wherein said endwall, said pressure container, and said adapter are separate components.

14. A vibration damper comprising:
   a cylinder filled with damping medium;
   a container surrounding said cylinder and forming a compensating space between the container and the cylinder;
   an endwall fixed to an end of the container and enclosing an end of the cylinder and an end of the compensating space, said endwall having a first filling channel connected to said compensating space and a closing element in the first filling channel, said first filling channel having a shoulder facing said compensating space;
   a spring which loads the closing element against the shoulder;
   a piston rod received through said endwall, the piston rod being connected to a piston which is movable in the cylinder;
   a pressure container in said compensating space; and
   an adapter having first and second ends and a second filling channel extending from said first end to said second end, said adapter having an upper part proximate said first end fixed to said endwall and a connecting part proximate said second end connected to said pressure container such that said pressure container is connected to said end wall only by said adapter, wherein the upper part and the connecting part are formed as separate pieces, the upper part having a retaining part which is connected to the connecting part, said second filling channel of said adapter having a first open end which communicates with said first filling channel in said endwall, and a second open end inside said pressure container.

15. A vibration damper comprising:
   a cylinder filled with damping medium;
   a container surrounding said cylinder and forming a compensating space between the container and the cylinder;
   an endwall fixed to an end of the container and enclosing an end of the cylinder and an end of the compensating space, said endwall having a first filling channel connected to said compensating space and a closing element in the first filling channel, wherein the closing element opens the first filling channel in the endwall when a predetermined temperature is exceeded, said first filling channel having a shoulder facing said compensating space;
   a spring which loads the closing element against the shoulder;

a piston rod received through said endwall, the piston rod being connected to a piston which is movable in the cylinder;

a pressure container in said compensating space; and an adapter having first and second ends and a second filling channel extending from said first end to said second end, said adapter having an upper part proximate said first end fixed to said endwall and a connecting part proximate said second end connected to said pressure container such that said pressure container is connected to said end wall only by said adapter, said second filling channel of said adapter having a first open end which communicates with said first filling channel in said endwall, and a second open end inside said pressure container.

16. A vibration damper comprising:

a cylinder filled with damping medium;

a container surrounding said cylinder and forming a compensating space between the container and the cylinder;

an endwall fixed to an end of the container and enclosing an end of the cylinder and an end of the compensating space, said endwall having a first filling channel connected to said compensating space and a closing element in the first filling channel, said first filling channel having a shoulder facing said compensating space;

a spring which loads the closing element against the shoulder, wherein the spring is supported on the adapter;

a piston rod received through said endwall, the piston rod being connected to a piston which is movable in the cylinder;

a pressure container in said compensating space;

and an adapter having first and second ends and a second filling channel extending from said first end to said second end, said adapter having an upper part proximate said first end fixed to said endwall and a connecting part proximate said second end connected to said pressure container such that said pressure container is connected to said end wall only by said adapter, said second filling channel of said adapter having a first open end which communicates with said first filling channel in said endwall, and a second open end inside said pressure container, wherein the adapter has an end face with a transverse channel, the spring being supported against the end face.

* * * * *